(12) United States Patent
Kavanaugh et al.

(10) Patent No.: US 7,830,804 B2
(45) Date of Patent: *Nov. 9, 2010

(54) QUALITY OF SERVICE APPLICATION PROGRAMMING INTERFACE OVER SOCKET

(75) Inventors: Richard Thomas Kavanaugh, Encinitas, CA (US); Gustav Vos, Surrey (CA)

(73) Assignee: Sierra Wireless, Inc., Richmond, BC (CA)

( * ) Notice: Subject to any disclaimer, the term of this patent is extended or adjusted under 35 U.S.C. 154(b) by 134 days.

This patent is subject to a terminal disclaimer.

(21) Appl. No.: 12/009,231

(22) Filed: Jan. 16, 2008

(65) Prior Publication Data

US 2008/0181116 A1 Jul. 31, 2008

Related U.S. Application Data

(60) Provisional application No. 60/881,104, filed on Jan. 17, 2007.

(51) Int. Cl.
*H04L 12/26* (2006.01)
(52) U.S. Cl. ...................................... 370/236; 370/463
(58) Field of Classification Search ........................ None
See application file for complete search history.

(56) References Cited

U.S. PATENT DOCUMENTS

| | | | |
|---|---|---|---|
| 6,449,650 B1 * | 9/2002 | Westfall et al. | 709/228 |
| 6,640,248 B1 | 10/2003 | Jorgensen | |
| 2002/0010771 A1 * | 1/2002 | Mandato | 709/223 |
| 2002/0044567 A1 * | 4/2002 | Voit et al. | 370/467 |
| 2003/0093526 A1 | 5/2003 | Nandagopalan et al. | |
| 2005/0002333 A1 * | 1/2005 | Aalders et al. | 370/230 |
| 2005/0210126 A1 | 9/2005 | Friedman | |
| 2006/0092963 A1 * | 5/2006 | Bakre et al. | 370/437 |
| 2006/0149845 A1 | 7/2006 | Malin | |
| 2007/0165565 A1 * | 7/2007 | Jung et al. | 370/329 |
| 2007/0217406 A1 * | 9/2007 | Riedel et al. | 370/389 |
| 2008/0107092 A1 * | 5/2008 | Taaghol et al. | 370/338 |

* cited by examiner

*Primary Examiner*—Min Jung
(74) *Attorney, Agent, or Firm*—Nixon Peabody LLP

(57) ABSTRACT

Disclosed is a Quality of Service (QoS) control mechanism for QoS-aware network applications running on computer devices. The mechanism provides IP socket-based QoS Application Program Interfaces (APIs) for QoS-aware applications for accessing MAC layer QoS function of network access devices. In various embodiments, the QoS mechanism utilizes QoS API over Socket (QAoS) handler and/or a MAC layer QAoS handler wrapper at the network access device to control and monitor the QoS data being transmitted by the application over the active network interface(s).

39 Claims, 3 Drawing Sheets

QUALITY OF SERVICE APPLICATION PROGRAMMING INTERFACE OVER SOCKET

CROSS REFERENCE TO RELATED APPLICATIONS

This application claims benefit of Provisional Application No. 60/881,104 filed on Jan. 17, 2007, which is incorporated by reference herein in its entirety.

TECHNICAL FIELD

This present disclosure relates to the field of communication networks and, more specifically, to the Quality of Service (QoS) support for network applications.

BACKGROUND

As network enabled computing systems and networks become ubiquitous and more diverse, so do the data communication requirements of applications that utilize these networks. With this proliferation of computing devices, there is a growing need to provide the necessary Quality of Service (QoS) for these communications services. QoS is generally referred to a resource reservation control mechanisms that allows network applications to maintain the guaranteed level of performance for the data flowing over various networks. Using QoS mechanisms, network access devices, such as modems, routers, switches and network servers, can provide different priority to different applications, users, or data flows, or to guarantee a certain level of performance.

Application network traffic types that may require a specific QoS include streaming multimedia, IP telephony, gaming, and others. Each type of network traffic may requires a different type of data delivery service. For example, streaming multimedia typically requires a high guaranteed throughput with reliable data delivery and a low level of variability of delay. On the other hand, IP telephony typically require strict limits on delay and jitter, but is much more tolerant of data loss. Therefore, it is desirable for the networks to provide different QoS to each application in order to meet the user's expectations and provide a good user experience for that specific application.

One know approach for a QoS-aware application to establish and maintain the necessary QoS for its network traffic is though QoS Application Programming Interfaces (API) of the computing device on which the application runs. Typically, computing devices provide QoS APIs as part of an Operating Systems (OS) or platform specific library or service. Therefore, such QoS APIs are inherently OS or platform specific. Given this, it is difficult to design network applications with a QoS support across various OS, platforms and networks. Attempts to do so typically result in an very complicated APIs or APIs with level of QoS coarseness and transparency that is too abstracted to provide any meaningful specification of QoS levels to the application.

This abstraction invariably results with the QoS API forgoing detailed control monitoring of the MAC layer functions. In the ISO OSI architecture, Medium Access Control (MAC) functions govern the device's ability to access the network and have a significant impact on the overall QoS of the data communications service. In addition, MAC functions measure dynamic conditions of the network, such as level of interference and signal strength and, thus, crucial in monitoring levels of QoS of the network traffic. Therefore, to ensure effective and successful support of QoS for network applications, it is desirable for the MAC functions to be part of the QoS service solution.

OVERVIEW

Disclosed is a QoS control mechanism which provides QoS APIs for QoS-aware applications running on computer devices for accessing the QoS functions of network devices via IP sockets. In one example embodiment, the APIs associated with the non-QoS-aware operating systems may be replaced with the QoS APIs. The QoS API may cooperate with QoS functions of the network devices to achieve improved QoS support for the application. In one embodiment, the QoS support may be implemented in the firmware of the physical network device and/or in the device driver(s) for the device. In another embodiment, an implementation of a higher-level device driver to manage communications across multiple network devices and coordinate data communications across multiple networks to ensure the desired QoS service level may be provided.

In one example embodiment, a novel QoS control mechanism utilizes QoS API over Socket (QAoS) handler and/or a MAC layer QAoS handler wrapper to control and monitor the QoS of the data being transmitted and received by the application over the active network interface or interfaces. This mechanism allows support for network access devices connected directly to the system bus of the computer device or indirectly through an external interface. This support is provided in a largely OS and platform independent manner. OS- or platform-specific QoS API support or usage in the application may not be required. In addition, the disclosed QoS control mechanism provides scalability to attach to future revisions for new network and MAC layer QoS schemes without requiring a change to the OS or platform. Other advantages of the disclosed QoS control mechanism will become apparent to those skilled in the art.

In one example embodiment, a system for QoS control comprises one or more QoS-aware applications and one or more QoS-supporting network access devices. The system further comprises a QoS management and reporting communications protocol that operates between the one or more QoS-aware applications and the one or more QoS-supporting network access devices. The protocol is exchanged through a bi-directional connection, such as an Internet Protocol (IP) socket. The QoS-aware applications control and manage QoS of data communications streams through a network access device.

In another example embodiment, a method for QoS control comprises communicating data between one or more QoS-aware applications and one or more QoS-supporting network access devices using a QoS management and reporting communications protocol. The method further comprises controlling and managing the QoS for one or more data communications streams through a network access device. The management and reporting communications protocol is exchanged through a bi-directional connection, such as an IP socket.

Yet in another example embodiment, a method for QoS control comprises establishing a bi-direction connection between a QoS-aware application and a QoS-supporting network access device and communicating QoS-related data through the established bi-direction connection. The bi-direction connection may be an IP socket. The connection may be established between a QoS-aware application and a MAC layer of the QoS-supporting network access device. The QoS-related data may be communicated using a QoS management and reporting communications protocol.

BRIEF DESCRIPTION OF THE DRAWINGS

The invention may be best understood by referring to the following description and accompanying drawings that are used to illustrate embodiments of the invention.

In the drawings.

DETAILED DESCRIPTION OF EXAMPLE EMBODIMENTS

Those of ordinary skill in the art will realize that the following description of a QoS control system and methods are illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations of QoS control mechanism are shown and described. It will, of course, be appreciated that in the development of any such actual implementation of the network access mechanism, numerous implementation-specific decisions must be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of telecommunication networks having the benefit of this disclosure.

In accordance with this disclosure, the components, process steps, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium.

Figure 1:
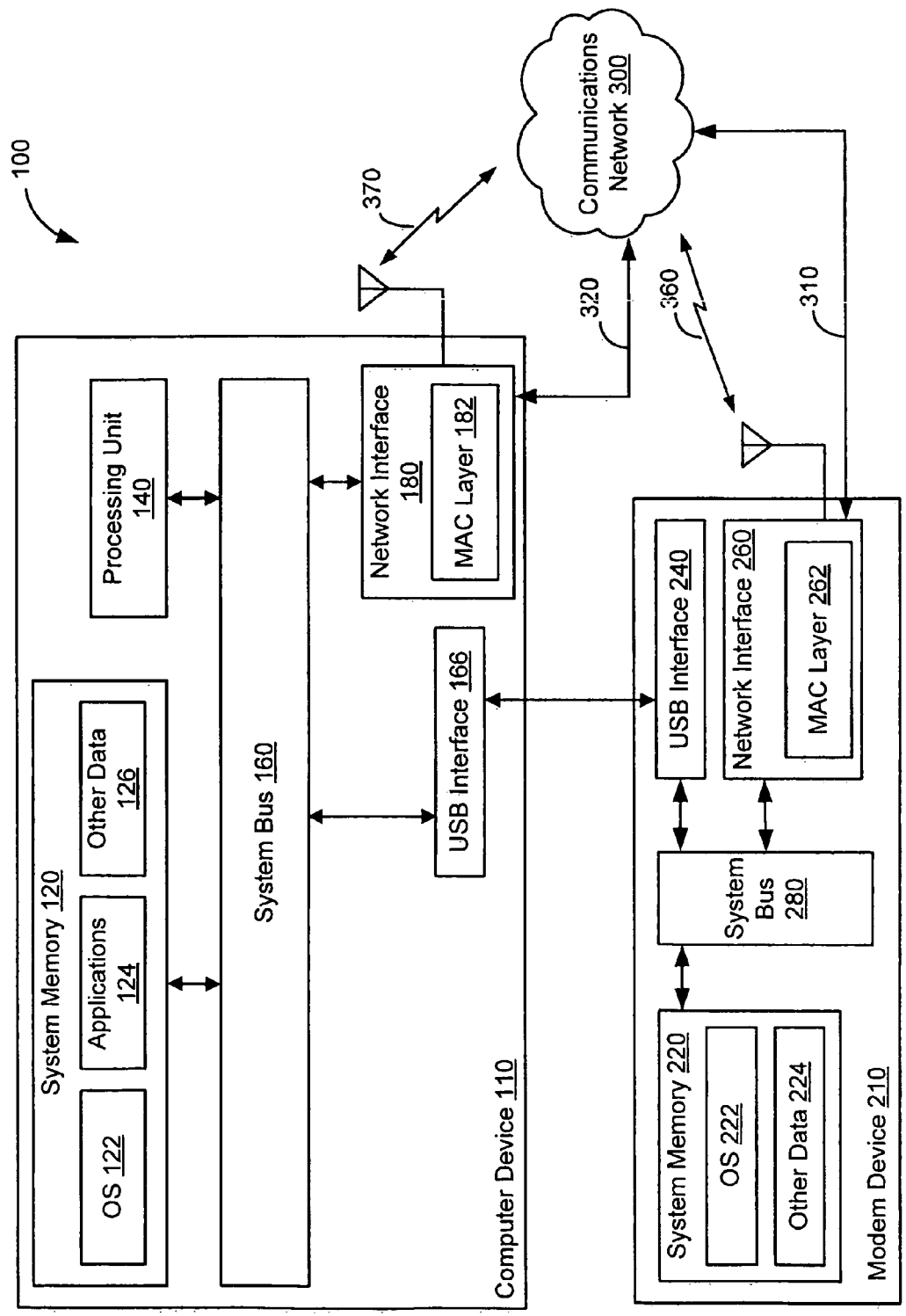
FIG. 1 is a diagram of one example embodiment of a network architecture.

The block diagram in FIG. 1 illustrates one example embodiment of computer system with the capability to perform data communications over one or more communication networks in accordance with principles described herein. Computer system 100 may include, but is not limited to, a personal computer, a laptop computer, a tablet computers, a notebook computer, an ultra-mobile personal computer, a server, a cellular phone, a personal digital assistant, a multimedia device, such as audio player, video player, gaming machine console, digital camera, video camera, and any other computer controlled devices that is capable of data communications over a network 300.

Communication network 300 may include, but is not limited to, a wired communication network 310, 320 and a wireless communication network 360, 370. For example, communication network 300 may include, but is not limited to, a Wireless Local Area Network (WLAN) that utilizes Ethernet (IEEE 802.3), IEEE 802.11, or other current or future LAN systems, Wireless Wide Area Network (WWAN) that utilize 3GPP (e.g. UMTS, HSDPA, LTE), 3GPP2 (e.g. CDMA, EVDO) or other current or future WWAN systems, Wireless Metropolitan Area Network (WMAN) systems that utilize WiMAX (IEEE 802.16) or other current or future WMAN systems, Wireless Personal Area Network (WPAN) that utilize IEEE 802.15, Bluetooth, and other WPAN systems.

In one example embodiment, computer system 100 may include a general purpose computer device 110, which includes a processing unit 140, such as an Intel® Dual-Core™ or Pentium® processors, an AMD Turion™ 64 processor or other types of CPU. It further includes a system bus 160 that interconnects components of device 110. Device 110 further includes a system memory 120 that stores the Operation System (OS) 122. The system memory 120 may also store one or more QoS-aware applications 124 to be run on the processing unit 140, and other types of data 126. The system memory may include a random access memory (RAM), a read only memory (ROM), a programmable ROM (PROM), an erasable PROM (EPROM), a FLASH-EPROM and other types of dynamic, volatile and nonvolatile information storage medium. Device 110 further includes one or more wired and/or wireless networking interface devices 180 connected directly to the computer device 110 through the system bus 160, and one or more external device interfaces, such as a USB serial bus 166, a serial port, and IEEE 1394.

In one example embodiment, the external device interface, such as interface 166, may be connected to one or more computer devices capable of performing data communication over a network on behalf of the computer system 100. Such an external device may be a modem device 210, such as a dial-up modem, a cable modem, a DSL model, or other network access devices, such a router, a switch, a wireless access point and the like. The modem device 210 includes a corresponding external device interface, such as a USB interface 240, to provide a connection to the computer device 110 for exchanging control and networking traffic data, and one or more wireless and/or wired networking interface devices 260. Such modem device 210 may also include internal system memory 220 with a standalone OS 222 and other data 224, as well as an internal system bus 280 depending upon the complexity of the modem device 210.

It will be appreciated by those skilled in the art that in order for a QoS-aware application 124 to achieve the desired QoS for data communication over a network 300, assuming the application 124 requires a level of QoS higher than best effort that the computer device 110 can achieve and guarantee, the desired level of QoS without an interface to the QoS capability of the communication network 300, an interface must exist between the application 124 and the element in the MAC layer 182, 262 of a network interface device 180, 260 that is responsible for accessing the QoS capability of a communication network 300. Accordingly, there is a need for a unique socket-based or other type of bi-directional link between the QoS-aware application 124 and QoS functions of the network interface devices 180, 260.

In one example embodiment, a novel QoS control mechanism provides QoS APIs for QoS-aware application 124 running on computer device 110 for accessing the MAC layer QoS functions of network interface devices 180, 260. In one example embodiment, the QoS control mechanism provides support for network access devices connected directly to the system bus 160 of the computer device 110 or indirectly through an external interface, such as USB interface 166. This support is provided in a largely OS- and platform-independent manner. It will be appreciated by those skilled in the art that OS- or platform-specific QoS API support in application 124 may not be required.

In one example embodiment, the network access mechanism may include an easily and well recognizable data communications interface, such as sockets, IP-based or others, to be used to transport QoS API messages. These QoS API messages may be transported between the application 124 and the MAC layer of a directly or indirectly connected network interface devices 180, 260. Since the existence of such a data interface is typically used between the application and the MAC layer of the network device in order to transmit or receive any network traffic data, the data stack required to carry the QoS API over Socket (QAoS) messaging will typically be present in such a computing device and in the network interface devices 180, 260.

In one example embodiment of the network access mechanism, the QAoS capability of the MAC layer of a network interface device 180, 260 may be embodied in a MAC layer QAoS handler (MQA). The MQA may be created in either the actual MAC layer of a networking interface device or as a wrapper around one or more MAC layers for one or more corresponding network interface devices. In the case where the MQA exists as a wrapper around a MAC layer that may or may not support a MQA natively, the MQA may exist within the network interface device, within a device or intermediate device driver for one or more network interface devices to interface with the computer device 110, as part of the OS 122 or in other ways. The latter cases may be used when a computer system 100 supports more than one network simultaneously and it is desirable to maintain QAoS sockets between the application 124 and the MQA when the data communication is being handed off amongst different networks 320, 370 over time.

Figure 3:
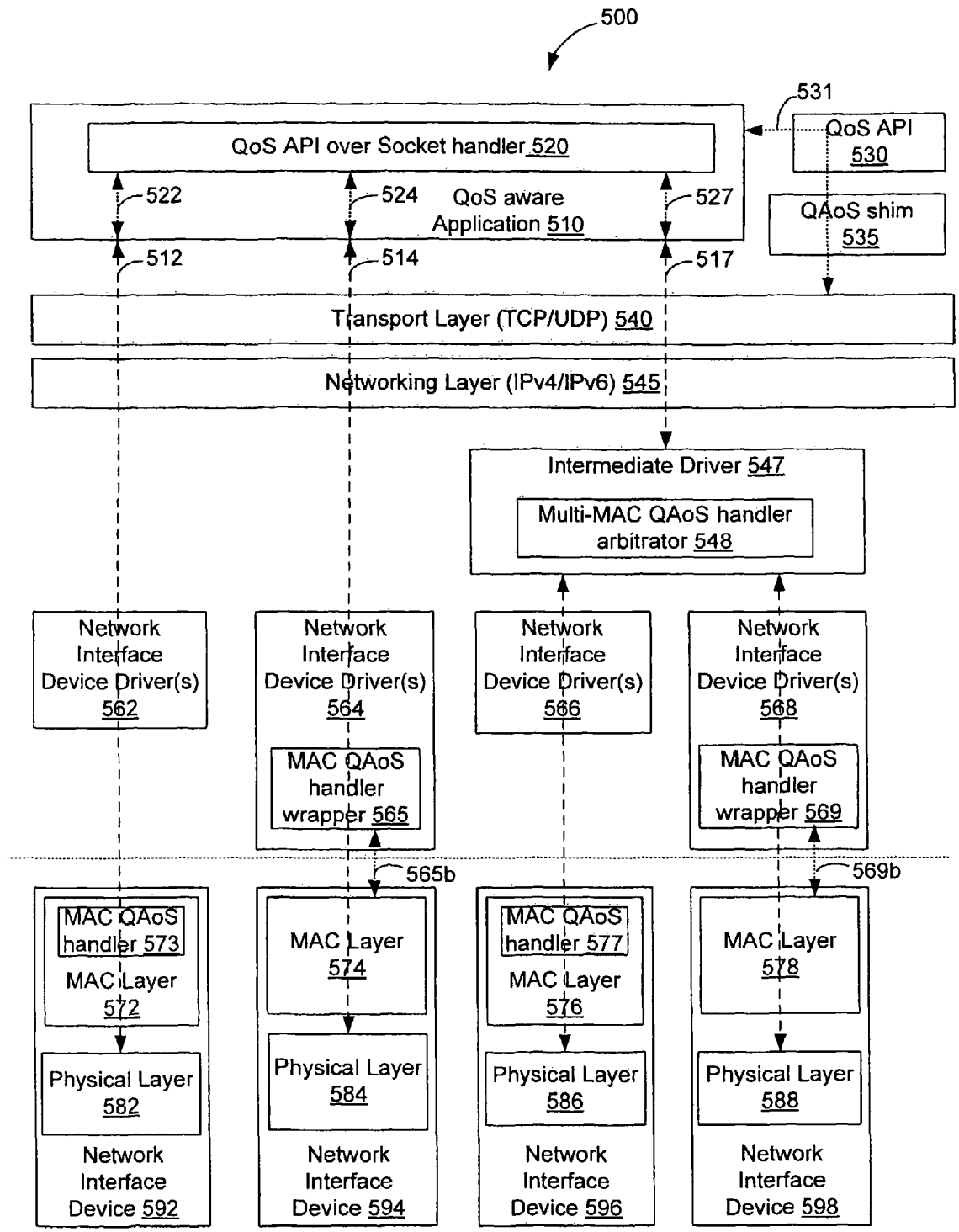
FIG. 3 is a diagram one example embodiment of a QoS control mechanism.

FIG. 3 illustrates one example embodiment of the novel QoS control mechanism which achieves the level of QoS desired by a QoS-aware application 510 through a QoS API messaging protocol that is tunneled over sockets 522, 524, 527, such as TCP/IP or UDP/IP sockets, between a QoS aware application 510 and a MAC layer 573, 565, 577, 569 QoS management element of a networking interface device 592, 594, 596, 598 through the transport protocol layer(s) 540 and networking protocol layer(s) 545 of the OS and platform of the computer device the application 510 is running on. The disclosed QoS API over Socket (QAoS) mechanism provides a largely OS- and platform-independent way to interface to the MAC layer 573, 565, 577, 569 QoS management element of a networking interface device assuming that there is a mechanism for the QAoS messaging to interface to such a QoS management element.

In one example embodiment, a QAoS capable application 510 may include a QAoS handler 520. Handler 520 is configured to initiate, maintain, and remove QAoS sockets 522, 524, 527 over the same or similar socket interfaces used for communication of non-QAoS data in attempt to meet the QoS requirements of the application 510. Therefore, there is very little additional development required for application 510 to support the usage of a QAoS interface for an OS and platform for which application 510 already supports non-QAoS data communication across a QAoS capable networking interface device. In addition, the level of effort for porting support for QAoS across different OSs and platforms should be largely limited to the effort for porting support for non-QAoS data communication across the same set of different OSs and platforms.

In one embodiment, a MAC QAoS API handler (MQA) is provided for terminating any QAoS socket 522, 524, 527 from the application 510. MQA 573, 565, 569, 577 facilitate server type management of the establishment, maintenance and termination of QAoS sockets. MQA 573, 565, 569, 577 enable translation and forwarding the QAoS socket messaging requests received by the application 510 to the MAC layer protocol messaging of the underlying network and network interface device 592, 594, 596, 598. MQA 573, 565, 569, 577 translate and report any relevant MAC layer QoS status and event notifications to the application 510 through a QAoS socket 522, 524, 527. MQA 573, 565, 569, 577 translate and forward any responses received from the MAC layer 573, 565, 577, 569 QoS management element for any requests previously forwarded to the MAC layer from the application 510. MQA 573, 565, 569, 577 are also configurable to provide other functions known to those skilled in the art.

In one example embodiment, MQA 573, 577 may exist natively in the MAX layer 572, 576. However, in another example embodiment, if the MAC layer of a networking interface device does not natively include a MQA, a MAC QAoS handler (MQA) wrapper 565, 569 may exists somewhere between the networking stack 545 of the computer device that application 510 is running on and the MAC layer 574, 578 of the network interface devices 594, 598, so that there will be an interface 565b, 569b for the QAoS messaging to the QoS management element of the MAC layer 574, 578. Those of skill in the art may recognize that the above examples are not limiting and that MQA may exist in other forms and other locations of the computer system.

In one example embodiment, MQA wrapper 565, 569 may be located in the device drivers 564, 568 provided for the networking interface device 594, 598, so that the device appears as if it natively provides MQA support to the OS, platform and application 510 as long as the drivers that are required for non-QAoS data communication are present and installed on the OS and platform of the computer device that application 510 is running on. However, it is possible that the MQA could be located at a protocol layer higher than the device drivers of a networking interface device thus creating more QAoS dependency on the OS and platform of the computer device that application 510 is running on. Though this is less desired, there are other benefits to this approach that will be made apparent from further description of various embodiments.

In the case that a computer system supports connectivity with several networks simultaneously (e.g., wired and wireless), application 510 may be configured to maintain its QAoS sockets with MQA while the data communication is being handled off over time and/or dynamically or statically distributed amongst different networks simultaneously via two or more different network interface-devices 596, 598. To that end, a Multi-MAC QAoS handler arbitrator (MMQAA) 548 may be provided to terminate and maintain a single set of QAoS sockets 527, 517 between application 510 and two or more MQAs and/or MQA wrappers 577, 569, so that the QoS related operations caused by the handoff between networks and corresponding network interface devices 596, 598 or dynamic or static distribution of data across the same networks is transparent to the application 510 that utilizes the QAoS sockets 527, 517 if this seamless QoS operation across multiple network connections is desired by the application 510.

In one example embodiment, MMQAA 548 may be contained within an intermediate device, such as an intermediate driver 547, which may be directly or indirectly associated with the networking interface devices 596, 598. In this manner MMQAA 548 is relatively independent from the OS and underlying computing platform. Furthermore, MMQAA 548 may be configured to arbitrate QAoS sockets 527, 517 and operations carried thereon, so that the intermediate driver 547 must be present as long as the drivers that are required for non-QAoS data communication arbitration across the network interface devices are present and installed on the OS and platform of the computer device that application 510 is running on.

In another example embodiment, MMQAA 548 may be contained within an OS or platform specific portion of the computer device the application 510 is running on. In this case, the MMQAA 548 can be embodied to maintain seamless and transparent QAoS sockets and operations with an application 510 across any available networking interface device connected to the computer system for which the MMQAA 548 has the ability to arbitrate QAoS operation between the MQA of the network interface device and the MQA(s) of one or more network interface devices connected to the same computer system. Those of skill in the art may recognize that the above examples are not limiting and that MMQAA may exist in other forms and other locations of the computer system.

In order to provide for any legacy applications 510 that already utilize an OS- or platform-specific QoS API 530 for which the OS or platform is to deprecate the existing OS or platform specific QoS API, a QAoS shim 535 may be provided in accordance with one example embodiment. The QAoS shim 535 may perform any necessary translations 531 between the OS or platform specific QoS API 530 and the MQAs 573, 565, 577, 569 over the QAoS messaging sockets 512, 514, 517 of any connected MQA-capable network interface device 592, 594, 596, 598. For example, the format of the QoS requests and responses provided by the QoS API 530 may not correspond (map 1-to-1) to the QoS requests and response messages supported in the MQA in use (i.e. they may be speaking different QoS control and status messaging protocol languages/APIs). In this case, the QAoS Shim 535 may perform the translation of the QoS API language between the OS/Platform and the MQA in use. In another example, the OS/Platform-specific QoS API 530 may only provide high-level (e.g. service Layer) QoS APIs to the QoS-aware application 510 and the QAoS shim 535 may translate between the upper level QoS APIs to the lower level (e.g. network layer) QoS APIs supported by the MQA in use. Yet in another example, the QoS service flow, classification, etc. attributes to be specified by the application through the OS/Platform-specific QoS API 530 may not support the same granularity, ranges, enumerations, etc. that are supported by the MQA of the associated network interface device(s) in use. Therefore, the QAoS shim 535 would translate between these API attribute differences. In another example, the OS/platform-specific QoS API may only be designed to specify the QoS capabilities of the radio access technologies available in the industry at the time of inseption of the OS/platform (e.g. 802.3 and 802.11). In this case, for scalability, the QAoS shim 535 may provide the necessary translation for the new QoS capability supported in new radio access technologies (e.g. 802.16m) as they became available without having to upgrade the OS/Platform-specific QoS API. Those of skill in the art may recognize that there are other methods for integrating the embodiments of the disclosed QoS control mechanism with the legacy applications or computer systems.

Those of skill in the art may recognize that when the MQA-enabled network device has an IP address, messages sent to this IP address by the QoS-aware application may be looped back by the OS of the computer device on which QoS-aware application is running. In order to avoid this problem, an additional entry may be made in the OS routing table to accommodate for the MQA-enabled network device. The MQA may monitor the incoming data traffic filtering on its assigned IP address. If there is a match and it is not a QAoS message, it will be looped back to the OS (this maintains backward compatibility). If there is a match and it is a valid QAoS message, then it is processed by the MQA. The QoS-aware application may monitor or register for OS call-backs indicating when a network device has obtained an IP address. This will be the trigger to the application to start a QAoS session with the MQA-enabled network device by generating a QAoS packet with destination address set to that of the new network device. A unique port number may be determined by the normal TCP session methods.

Accordingly, the assigned IP addresses are used by the application to identify each MQA-enabled network device and the unique port numbers are used by the MQA to uniquely define the QoS-aware applications. In this manner, each socket between a specific QoS-aware application and a MQA of one or more associated network interface devices is unique, so that MQA can identify and differentiate the requesting application from any other application and the requesting application can identify and differentiate a particular MQA and associated network interface device(s) for which a QAoS message was received from. Furthermore, the OS routing table updates guarantee that application packets always get routed to the appropriate MQA-enabled network devices regardless of the default routing table entry or whether a VPN is being used.

Figure 2:
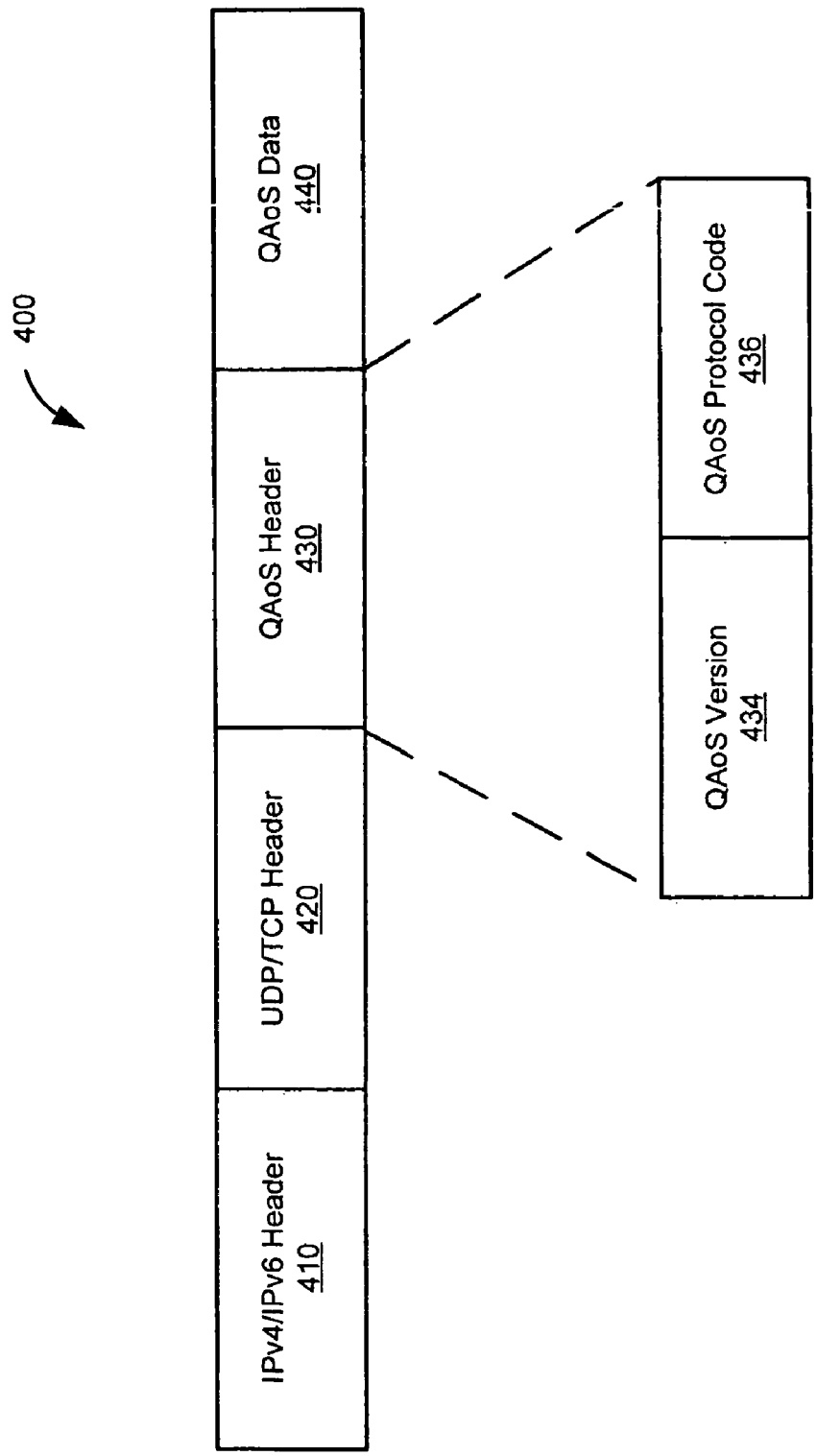
FIG. 2 is a diagram of one example embodiment of a QoS message.

In one example embodiment, a QoS API messaging protocol is provided. FIG. 2 depicts one example embodiment of the QAoS message format. A message 400 may comprise an Internet protocol header 410, a transport protocol header 420, a QAoS header 430 and QAoS data 440. The QAoS header 430 may include QAoS version number 434 and QAoS protocol code 436, which identify the particular type of QAoS protocol used by the system. As indicated, the protocol messages may be encapsulated in a QAoS packet header 430. This encapsulation mechanism allows for specification and negotiation of the actual data payload formats of the QAoS messaging between the applications and the MQA. This allows for both standardized and proprietary QoS API messaging protocols, and multiple revisions of such protocols, to be supported for transport of QoS API messaging between the applications and the MQA.

Once a socket is established over QAoS and the QoS API messaging protocol and revision is negotiated with the MQA, the application can use QAoS to receive QoS notifications and send QoS requests. The QoS notifications may include information on current availability of different levels and types of QoS in the network, the set of available and/or active network service flows, the corresponding available and/or active classifier(s) of each of the service flows, the current and available service flow data marking schemes supported by the network, any defined and/or active network filtering or throttling of data and other services. The QoS requests may be used to negotiate, add, modify, delete, attach to, detach from, activate and deactivate QoS service flows, classifiers, data filtering, shaping, and data throttling features of the MAC layer of the network interface device(s) and the corresponding network(s).

The QAoS link between the application and MQA can also be used to report QoS attribute and status changes in the corresponding network(s). In one example embodiment, the network device may be constantly monitoring the network characteristics, and if these characteristics change such that the agreed-upon QoS service level is no longer achievable, communicate with the QoS-aware application and inform it of the change, so that the QoS-aware application may decide whether to take any necessary action. In response to a QoS request from a QoS-aware application, the network device may insert/attach the Network Layer tags or Network Layer messages thereby instructing downstream network routing devices to implement Network Layer QoS mechanisms requested by the given QoS-aware application.

In one example embodiment, the MQA of the network interface device may send broadcast QoS API event notifications to all listening QoS-aware applications over an easily recognizable and unique multicast socket. QoS-aware applications may register and de-register for such a multicast QAoS socket. In another example embodiment, the application may re-register and/or the MQA may ping the application in order to provide a method for the MQA to determine when it is allowable to free a stale QAoS socket and the acquired network QoS resources of the associated socket. In various alternative embodiments, the MQA may provide other functions known to those of skill in the art.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. An apparatus comprising:
a memory; and
a quality of service (QoS) API over socket (QAoS) module that is independent of an operating system (OS) of a computing device and that is configured to be communicatively coupled to a MAC layer of a network access device by way of a QoS management and reporting communications protocol that is tunneled over sockets between the QAoS and the MAC layer of the network device, the network access device configured to provide network access to the computing device, the QAoS operable to access MAC layer QoS functions of the network device to thereby control and manage QoS of computing device data communications streams provided through the network access device.

2. The apparatus of claim 1, wherein the QoS management and reporting communications protocol is exchanged through a bi-directional connection.

3. The apparatus of claim 1, wherein the MAC layer QoS functions of the network access device are implemented in the network access device.

4. The apparatus of claim 1, wherein the MAC layer QoS functions of the network access device are implemented in a device driver for the network access device.

5. The apparatus of claim 1, wherein the QoS management and reporting communications protocol operates over well-known data communications services.

6. The apparatus of claim 5, wherein the well-known data communications services include Internet Protocol based sockets.

7. The apparatus of claim 1, wherein the QoS API over socket (QAoS) communicates with the MAC layer of the network access device through an intermediate device that implements the QoS management and reporting communications protocol.

8. The apparatus of claim 1, wherein the network access device is an intermediary for a plurality of network access devices.

9. The apparatus of claim 8, wherein the network access device routes the data communications streams over one or more of the plurality of network access devices.

10. The apparatus of claim 1, wherein the network access device provides QoS status information to the QoS API over socket (QAoS) using the QoS management and reporting communications protocol.

11. The apparatus of claim 1, wherein the network access device is remotely connected to the QoS API over socket (QAoS) through a data communications link.

12. The apparatus of claim 11, wherein the data communications link is a wired communications link.

13. The apparatus of claim 11, wherein the data communications link is a wireless communications link.

14. A method for implementing a quality of service (QoS) control mechanism for use with a computing device having an operating system (OS) coupled to a network access device that is configured to provide network access to the computing device, the method comprising:
using the computing device to execute programmable instructions for accessing a MAC layer of the network access device;
tunneling, over sockets, a QoS management and reporting communications protocol between a QoS API over socket (QAoS) that is independent of the operating system (OS) of the computing device and the MAC layer of the network access device to thereby provide access to MAC layer QoS functions of the network device; and
using the accessed MAC layer QoS functions for controlling and managing QoS of one or more computing device data communications streams provided through the network access device.

15. The method of claim 14, wherein the QoS management and reporting communications protocol is exchanged through a bi-directional connection.

16. The method of claim 14, wherein the MAC layer QoS functions of the network access device are implemented in the network access device.

17. The method of claim 14, wherein the MAC layer QoS functions of the network access device are implemented in a device driver for the network access device.

18. The method of claim 14, wherein the QoS management and reporting communications protocol operates over well-known data communications services.

19. The method of claim 18, wherein the well-know data communications services include Internet Protocol based sockets.

20. The method of claim 14, wherein the QoS API over socket (QAoS) communicates with the MAC layer of the network access device through an intermediate device that implements the QoS management and reporting communications protocol.

21. The method of claim 14, wherein the network access device is an intermediary for a plurality of network access devices.

22. The method of claim 21, wherein the network access device routes the data communications streams over one or more of the plurality network access devices.

23. The method of claim 14 wherein the network access devices provide QoS status information to the QoS API over socket (QAoS) using the QoS management and reporting communications protocol.

24. The method of claim 14, wherein the network access device is remotely connected to the QoS API over socket (QAoS) through a data communications link.

25. The method of claim 24, wherein the data communications link is a wired communications link.

26. The method of claim 24, wherein the data communications link is a wireless communications link.

27. A program storage device readable by a machine, embodying a program of instructions executable by the machine to perform a method, the method comprising:
at a computing device having an operating system (OS) coupled to a network access device that is configured to provide network access to a computing device, accessing a MAC layer of the network access device;
tunneling, over sockets, a quality of service (QoS) management and reporting communications protocol between a platform- and operating system-independent QoS API over socket (QAoS) and the MAC layer of the network access device to thereby provide access to MAC layer QoS functions of the network device; and
using the accessed MAC layer QoS functions for controlling and managing QoS of one or more data communications streams through the network access device.

28. The program storage device of claim 27, wherein the QoS management and reporting communications protocol is exchanged through a bi-directional connection.

29. The program storage device of claim 27, wherein the MAC layer QoS functions of the network access device are implemented in the network access device.

30. The program storage device of claim 27, wherein the MAC layer QoS functions of the network access device are implemented in a device driver for the network access device.

31. The program storage device of claim 27, wherein the QoS management and reporting communications protocol operates over well-known data communications services.

32. The program storage device of claim 31, wherein the well-known data communications services include Internet Protocol based sockets.

33. The program storage device of claim 27, wherein the QoS API over socket (QAoS) communicates with the MAC layer of the network access device through an intermediate device that implements the QoS management and reporting communications protocol.

34. The program storage device of claim 27, wherein the network access device is an intermediary for a plurality of network access devices.

35. The program storage device of claim 34, wherein the network access device routes the data communications streams over one or more of the plurality network access devices.

36. The program storage device of claim 27 wherein the network access devices provide QoS status information to the QoS API over socket (QAoS) using the QoS management and reporting communications protocol.

37. The program storage device of claim 27, wherein the network access device is remotely connected to the QoS API over socket (QAoS) through a data communications link.

38. The program storage device of claim 37, wherein the data communications link is a wired communications link.

39. The program storage device of claim 37, wherein
the data communications link is a wireless communications link.

* * * * *